United States Patent Office 3,689,439
Patented Sept. 5, 1972

3,689,439
PROCESS FOR PREPARING A CROSSLINKED POROUS POLYVINYL PYRROLIDONE GRANULE
Nathan D. Field, Allentown, and Earl P. Williams, Pen Argyl, Pa., assignors to GAF Corporation, New York, N.Y.
No Drawing. Continuation-in-part of abandoned application Ser. No. 736,302, June 12, 1968. This application Apr. 5, 1971, Ser. No. 131,434
Int. Cl. C08c *17/08;* C08d *13/08;* C08f *47/10*
U.S. Cl. 260—2.5 N                        14 Claims

ABSTRACT OF THE DISCLOSURE

A porous granular or porous bead form of a vinylpyrrolidone polymer is produced from a suspension of monomeric vinyl-pyrrolidone, optionally with additional monomer or monomers, and a controlled amount of crosslinking agent in an aqueous solution of an electrolyte, the suspension being maintained during polymerization by mechanical means. A free radical polymerization source is utilized. The resultant product maintains its particulate form after wetting.

RELATED APPLICATIONS

This application is a continuation-in-part of U.S. patent application Ser. No. 736,302 filed June 12, 1968, allowed Jan. 5, 1971 and herewith abandoned.

The present invention is directed to a novel crosslinked vinylpyrrolidone polymer and to a process of producing the same. More particularly, the present invention is directed to a granular or bead form of a crosslinked vinylpyrrolidone porous polymer and a process of producing the same from a suspension of the monomeric material and a crosslinking agent in an aqueous solution of an electrolyte.

Polyvinylpyrrolidone has a variety of uses. One such use is such as disclosed in U.S. Pat. 2,688,550; 2,947,633 and 3,117,004 wherein polyvinylpyrrolidone or modified forms thereof is employed as a clarifying agent for alcoholic or non-alcoholic beverages. The use of such polyvinylpyrrolidone as such a clarifying agent is due mainly to the ability of such material to remove phenolic and polyphenolic compounds such as anthocyanogens and other tannins and their oxidation products found in such beverages.

Originally, the polyvinylpyrrolidone was employed as a water-soluble powder. The water-soluble powder presented problems of excessive solubility of the polymer in the beverage, causing contamination. Later, water-insoluble polyvinylpyrrolidone homopolymers and copolymers were utilized as clarifying agents to avoid the excessive solubility of the water-soluble materials. However, such materials are available primarily as fine powders, and accordingly, their suitability was limited.

Thus, for example, the employment of the fine powders of water-insoluble polyvinylpyrrolidone necessitated the employment of special pressure filtration processes or centrifugation which were costly and undesirable to remove the finely powdered material from the beverage. Accordingly, both in processes for the clarification of alcoholic beverages and similar vegetable extract materials, as well as other utilities wherein the absorbtive capacity of polypyrrolidone is utilized, it has been desired to provide the polyvinylpyrrolidone in a more useful particulate form.

Previously, attempts have been made to provide polyvinylpyrrolidone in bead form. U.S. Pat. 2,810,716 describes a method; for preparing such bead-like material. These beads prepared with up to 1% of crosslinking agent maintain their particulate nature in dry form. However, when wetted, they absorb 30 to 100 times their own weight of water and swell to gel-like structures. When such beads are used as absorbates they swell to form gel-like particles which are easily broken and tend to clog filters. When used to pack absorbent columns, they expand to such an extent as to clog the columns to the passage of the liquid. The pressure of the swelling gel-like particles, if confined, can deform or burst the columns.

It has also been proposed in U.S. Pat. 3,294,765 to form beads of polyvinyl pyrrolidone by the use of a special crosslinking agent. However, here too the beads, when subjected to the liquid being treated formed gels. Such gels cannot be easily separated from the treated liquids and are wasteful of such treated liquids. Such prior art beads have not, when subjected to the liquids being heated, been able to maintain their stability or even to maintain their particulate form when swollen with liquid.

The present invention provides a crosslinked polymer of vinylpyrrolidone (including copolymers of vinylpyrrolidone and other monomeric materials) in a porous granular or bead form even when wetted and swollen with the liquid being treated and produced by a process wherein the monomeric material is polymerized with a controlled amount of crosslinking agent in an aqueous solution of electrolyte, the insoluble polymer being formed and excess monomer being maintained in suspension by mechanical agitation.

Accordingly, it is a principle object of the present invention to provide a novel crosslinked vinylpyrrolidone polymer and a process for producing the same in shape maintaining particulate form even when swollen with liquid.

A further object of the present invention is to provide a novel porous granular or bead form of polymer of vinylpyrrolidone and one or more copolymerizable monomers.

A still further object of the present invention comprises a process for preparing a shape-maintaining, porous, granular or bead form, of a vinylpyrrolidone polymer wherein a suspension of the monomeric material and at least a critical amount of a crosslinking agent in an aqueous solution of an electrolyte is maintained during free radical polymerization by mechanical means.

Still further objects and advantages of the product and process of the present invention will become more apparent from the following more detailed description thereof.

The objects and advantages of the process and product of the present invention are achieved through the production of a shape-maintaining, water-swellable, porous granular or bead form of a crosslinked vinylpyrrolidone polymer through polymerization of a solution of a monomeric material with at least 2.5% (by weight of the monomer) of a crosslinking agent in an electrolyte, the solution and suspension of polymeric material that is formed being maintained by mechanical means. The product that is formed by such a process comprises a water-swellable granular or bead form of porous crosslinked polyvinylpyrrolidone or copolymer of vinylpyrrolidone and additional copolymerizable monomer or monomers capable when water-swollen, of maintaining its granular or bead-like form.

In accordance with the process of the present invention, the monomeric vinylpyrrolidone with a crosslinking agent, and with or without additional copolymerizable monomeric material is present in an aqueous solution of electrolyte with a suitable cross-linking agent, the aqueous system and suspension of polymer formed being maintained by mechanical means, e.g., agitation, the polymerization being conducted in the presence of a source of free radicals.

It is essential that the total copolymerizable monomeric material should contain a very substantial amount of vinylpyrrolidone, that is, the additional copolymerizable monomeric material may be present in an amount up to 50%, preferably up to 20% by weight based on the total amount of the polymerizable reactants.

Examples of suitable comonomers which can be employed are the acrylates and α-substituted acrylates e.g. wherein the α-substitutent comprises methyl, ethyl, propyl and higher alkyl, phenyl, naphthyl and other aryl, the ester moiety being as methyl, ethyl, propyl and higher alkyl, phenyl, naphthyl and other aryl; vinyl ethers, e.g. methyl, ethyl, propyl and higher alkyl; acrylamide, and substituted acrylamides e.g. methacrylamide, N-methylacrylamide, N, N-dimethylacrylamide; N-vinylacetamide, acrylic acid, acrylonitrile, allyl acetate, allyl alcohol, crotonic acid, dimethylaminoethylvinyl sulfide, diethylhexyl maleate, didodecyl maleate, fumaramide, itaconic acid, methacrylic acid, methoxystyrene, methyl vinyl ketone, 3-methyl-N-vinylpyrrolidone, 2-methyl - 5 - vinylpyridine, styrene, trichloroethylene, vinylcaprolactam, vinylcarbazole, vinylimidazole, vinyl laurate, vinyl benzimidazole, 1,3-and 1,4- butanediol monomethacrylate, vinyloxazolidinone, vinyl oxyethylurea, vinyl propionate, vinyl pyridine, vinyl stearate, vinyl acetate (and the derived vinyl alcohol.)

The crosslinking agent is generally employed in amounts of at least 2.5% to about 20% by weight based upon the monomers, an amount of about 3% to about 8% by weight being preferred. The crosslinking agents that are suitably employed in accordance with the present invention in the production of the crosslinked porous bead or granular form of a vinylpyrrolidone polymer are those which contain 2 or more functional groups capable of taking part in the polymerization reaction so as to provide a polymeric material having a crosslinked three-dimensional structure.

Accordingly, suitable crosslinking agents that have been found particularly applicable in accordance with the present invention are the alkylenebisacrylamides, e.g., N, N'-methylenebisacrylamide, the alkylene glycol dimethacrylates, e.g. ethylene glycol dimethacrylate, diethylene glycol dimethacrylate, tetraethylene glycol dimethacrylate, higher polyethylene glycol dimethacrylate, 1,3- and 1,4- butanediol diacrylates and dimethacrylates, etc. and the divinyl aromatic compounds, e.g. divinylbenzene, divinylethylbenzene, divinylchlorobenzene, divinyltoluene, divinylnaphthalene, etc. Other suitable crosslinking agents include allyl acrylate, p-isopropenylstyrene, trivinyl meseate, diallyl maleate, divinyl ether, 1,3- or 1,4 divinyloxybutane, trivinyl citrate, divinyl o-phenylene diacetate, vinyl allyl ether, diethylene glycol diallyl ether, trivinyl glyceryl ether, divinyl glyceryl ether, tetravinyl pentaerythritol ether, hexahydro-1,3,5-triacryl-s-triazine, vinylpyrrolidone dimers described in U.S. Pat. 3,252,995 and the like.

Of course, mixtures of the above-cited suitable crosslinking agents can be advantageously employed where desired, provided at least 2.5% by weight of the combined crosslinking agent is present.

The monomeric vinylpyrrolidone, or mixtures of vinylpyrrolidone with a minor amount of a suitable copolymerizable monomer, and the proper amount of crosslinking agent are maintained in an aqueous solution of an electrolyte. The applicable electrolytes are generally alkali metal and ammonium salts. Thus, for example, suitable electrolytes include sodium, potassium and lithium sulfate; sodium, potassium, ammonium and lithium acetate; sodium, potassium and lithium chloride, etc. Sodium sulfate is a preferred electrolyte in accordance with the present invention. It is often beneficial to include a buffer such as disodium hydrogen phosphate in order to maintain the reaction mixture neutral to slightly alkaline.

The concentration of electrolyte or electrolytes suitably employed in accordance with the present invention must be sufficiently high so as to produce phase separation before or during the polymerization. Accordingly, it is preferred to employ an aqueous electrolyte mixture containing from about 5% to about 80%, preferably 10-30%, by weight of the electrolyte salt based on the weight of the water; for example, with sodium sulfate, about 10-20% by weight is preferred. Since the monomeric vinylpyrrolidone is not very soluble in the electrolyte solutions, when using more than enough vinylpyrrolidone to saturate the aqueous solution of electrolyte, a suspension of the excess monomer can be made through mechanical agitation. The use of excess undissolved salt is often beneficial since it is postulated that the solid becomes enmeshed in the bead of granule and upon dissolution increases the surface area of the granule.

In the polymerization process the relative proportion of total monomer to water is determined at the upper limit, by ability of heat removal and the danger of particle agglomeration and may be as high as about 80% monomer, preferably about 50%, based on the weight of water; the lower limit is inter alia based on convenience of operating without undue bulk and can be successfully operated with as low as 1% monomer, preferably 10%, based on the weight of the water.

The polymerization process of the present invention is conducted in the presence of a catalyst which provides a source of free radicals. In this respect, any of the conventional free radical initiator catalysts generally employed in vinyl polymerizations can be employed in accordance with the process of the present invention, such catalysts being added either to the mixture of monomers polymerized in accordance with the present invention or to the aqueous solution of electrolyte. Thus, for example, the catalyst can comprise any of the conventional peroxide catalysts, e.g. benzoyl peroxide, di-t-butyl peroxide, as well as the preferred azo catalysts, e.g. azobisisobutyronitrile.

The process of the present invention may be suitably carried out by adding all of the crosslinking agent and the monomeric material e.g. vinylpyrrolidone and any copolymerizable monomer to the aqueous solution of electrolyte in one single charge, by the addition of the materials in a suitable number of increments or portions or continuously during the polymerization reaction. While the temperature of polymerization is in no way critical and any suitable temperature conventionally employed in vinyl polymerization can be utilized, the polymerization reaction of the present invention is generally carried out at about 0° to about 100° C., in open vessels or up to about 150° C. in pressure vessels. For example, suitable crosslinking polymerization of the monomeric materials in the production of the crosslinked porous, bead or granular form of vinylpyrrolidone polymer can be accomplished in a period of up to 10 hours. Of course, a lowering or raising of the temperature below or above those limits set forth above will respectively increase or decrease the period of reaction necessary for polymerization.

The polymeric beads or granules that are formed can be purified by washing with water or an aqueous alcohol e.g. methanol, ethanol, etc. mixture. After drying, the polymeric beads or granules are produced in a high yield of usually 90–99%. In spite of the use of large amounts of salt in the electrolyte solution, the beads or granules that are formed after such washing and drying are practically ash free.

As noted above, the suspension of monomeric material and the polymer that is formed is maintained through agitation during the polymerization reaction. In this respect, any conventional agitation e.g. stirring, gas agitation, etc. can be employed.

In accordance with the present invention, the crosslinked polymer of vinylpyrrolidone, or vinylpyrrolidone and one or more copolymerizable monomers, is produced in the form of a porous granule or bead. Although the size of the porous, granule or bead that is produced in accordance with the polymerization process of the present invention varies depending on the degree of agitation and amount of materials used, generally undried beads or granules of from 1 mm. to 10 mm. in diameter are obtained. This represents a useful size for beverage clarification by percolation in columns although the bead size can be varied at will. Again, yields in the range of 90–99% are produced in accordance with the process of the present invention. Partially to fully dried beads can be ground to smaller diameter porous granules if desired. Drying of the beads yields porous granules of greatly diminished diameter.

The process and product of the present invention will now be described by reference to the following specific examples. It is to be understood, however, that such examples are presented for purposes of illustration only, and the present invention is in no way to be deemed as limited thereto.

EXAMPLE 1

Into a 500 ml. resin flask equipped with the thermometer, stirrer, gas inlet, dropping funnel, and condenser connected to gas outlet were charged:

40.0 g. (0.36 mole) distilled vinylpyrrolidone
0.12 g. azobisisobutyronitrile
240.0 g. distilled water
1.6 g. (0.010 mole) methylenebisacrylamide
0.46 g. 10% by weight $Na_2HPO_4$ solution
40.0 g. anhydrous sodium sulfate Air was removed by closing the gas inlet and applying enough vaccum at the gas outlet to cause violent ebullition for 30 seconds. The vacuum was then released by allowing nitrogen to enter the gas inlet. This procedure was repeated two more times and then a positive pressure of nitrogen maintained by connecting the gas outlet to a mineral oil blow-out leg having a depth of one inch of oil. The flask was heated with stirring in a constant temperature bath for 4 hours at a reaction temperature of 50 to 65° C. At the end of this time, a solution of 0.04 g. azobisisobutyronitrile
0.4 g. methylenebisacrylamide
10.0 g. C.P. ethanol
10.0 g. distilled water was charged to the dropping funnel and the air removed by violent ebullition and replaced with nitrogen. This procedure was repeated two more times by suitable adapters connects to the dropping funnel.

The above solution was then added to the contents of the flask and the heating continued for 2 additional hours at 62 to 63° C. At the end of this time, the beads produced were filtered and washed with one gallon of distilled water and then dried in a vacuum oven at 40° C.

The dried white beads weighing 41.5 grams (98.8% yield), were substantially ash-free, whiteness being due to the light scattering caused by the pores within the beads. The porosity was confirmed by microscope examination.

EXAMPLE 2

Following the procedure of Example 1,
40.0 g. (0.36 mole) distilled vinylpyrrolidone
0.4 g. azobisisobutyronitrile
200.0 g. distilled water
1.2 g. ethylene glycol dimethacrylate
0.5 g. 10% by weight $Na_3HPO_4$ solution
33.0 g. anhydrous sodium sulfate were charged to the resin flask and heated with stirring at a reaction temperature of 50 to 69° C. for a total of 5½ hours.

The beads were filtered and washed with 1 gallon distilled water and dried in a vacuum oven at 45 to 50° C.

The dried white beads weighed 39.0 grams (94.6% yield).

EXAMPLE 3

Following the procedure of Example 1,
40.0 g. (0.36 mole) distilled vinylpyrrolidone
0.12 g. azobisisobutyronitrile
240.0 g. distilled water
2.0 g. tetraethylene glycol dimethacrylate
1.0 g. 10% by weight $Na_2HPO_4$ solution
40.0 g. anhydrous sodium sulfate were charged to the resin flask and heated with stirring at a reaction temperature of 50 to 67° C. for a total of 5 hours. The washed and dried beads weighed 39.2 g. (93.3% yield).

EXAMPLE 4

Following the procedure of Example 1,
40.0 g. distilled vinylpyrrolidone
0.12 g. azobisisobutyronitrile
240.0 g. distilled water
6.0 g. polyethylene glycol dimethacrylate
2.0 g. 10% by weight solution $Na_2HPO_4$
40.0 g. anhydrous sodium sulfate were charged to the resin flask and heated with stirring at a reaction temperature of 50 to 67° C. for a period of 3¾ hours. At the end of which time a solution of 0.04 g. azobisisobutyronitrile
0.4 g. methylenebisacrylamide
10.0 g. C. P. ethanol
10.0 g. distilled water was added from the dropping funnel as in Example 1, and the heating continued for an additional 1½ hours at 60° C.

The washed and dried beads weighed 39.6 g. (94.2% yield).

EXAMPLE 5

Following the procedure of Example 1,
40.0 g. distilled vinylpyrrolidone
0.16 g. azobisisobutyronitrile
132.0 g. distilled water
1.6 g. p-divinylbenzene (99% purity of Shell Oil Co.)
0.14 g. 10% by weight $Na_2HPO_4$
35.0 g. anhydrous sodium sulfate were charged to the resin flask and heated with stirring at a reaction temperature of 50 to 84° C. for a period of 4.0 hours.

50 ml. methanol were added and stirred for ½ hour at 75° C. then filtered and washed as before. The dried beads weighed 41.6 g. (100% yield).

EXAMPLE 6

Production of copolymer of 60 parts vinylpyrrolidone, 40 parts acrylamide crosslinked with divinylbenzene. The following reactants were charged into a 1 liter stainless steel autoclave equipped with a four blade turbine type stirrer:

96.0 g. vinylpyrrolidone
8.0 g. divinylbenzene Dow DVB–55 (a mixture of isomers of divinylbenzene, ethyl vinylbenzene, and diethylbenzene, the total divinylbenzene content being 55.0%)
520.0 g. distilled water
2.8 g. 10% by weight $Na_2HPO_4$ solution
0.64 g. azobisisobutyronitrile
140.0 g. anhydrous sodium sulfate
64.0 g. acrylamide The autoclave was evacuated to 25 mm. and the vacuum released with nitrogen. This procedure was repeated two more times. The contents of the autoclave were then heated with stirring at 90° C. and held at that temperature for 3 hours. The beads were discharged, washed free of sodium sulfate and dried. The product yield was 151 g. (or 90% yield).

EXAMPLE 7

99 parts vinylpyrrolidone, 1 part acrylamide crosslinked with divinylbenzene. The following reactants were chared into a 1 liter stainless steel autoclave and treated in a manner similar to Example 6.

118.8 g. vinylpyrrolidone
1.2 g. acrylamide
390 g. distilled water
0.5 g. azobisisobutyronitrile
6.0 g. Dow DVB-55 divinylbenzene
105.0 g. anhydrous sodium sulfate
0.4 10% by weight $Na_2HPO_4$ solution The copolymer was produced in a yield of 94.7%.

EXAMPLE 8

This example is presented to illustrate the absorptive activity of the PVP-methylenebisacrylamide beads employing salicylic acid as a substrate in an aqueous slurry suitable for rapid filtration.

Salicylic acid was selected as a substrate since it contains both a phenolic hydroxyl and a carboxyl group. The phenolic group gives the substrate absorptive reactivity with the beads and the carboxyl group provides a means for the titration of salicylic acid with standard base. By titrating a solution for the amount of salicylic acid present before and after the addition of the beads, it is possible to determine the total amount of salicylic acid absorbed after filtration of the beads.

17.5 g. of wet beads (prior to drying step) prepared as in Example 1, were washed with a 1:1 mixture of methanol/water and allowed to stand in a filtration funnel while the excess liquid drained off. A similar portion so treated and dried for percent solids was found to contain 3.02 g. polymer.

The wet beads were added to 150.0 ml. of 0.1071 N salicylic acid and stirred for 20 minutes and then filtered rapidly.

A 50 ml. aliquot was titrated with 0.1034 N NaOH for the equivalent of salicylic acid remaining in solution. Some 34.0 ml. of the standard base were required indicating 1.456 gram salicylic acid remaining. The total salicylic acid charged was 2.218 grams. Accordingly, 0.762 grams of salicylic acid were absorbed by 3.02 gram polymer beads.

EXAMPLE 9

Absorptive activity of vinylpyrrolidone/acrylamide/divinylbenzene crosslinked beads based on 60 part vinylpyrrolidone/40 parts acrylamide.

In a manner similar to Example 8 16.8 g. wet beads (20% solids) prepared as in Example 1 were added to 150.0 ml. 0.0992 N salicylic acid and stirred for 20 minutes. A 50 ml. aliquot was titrated with 0.1188 N NaOH. 33.5 mls. the standard base were required or 0.405 g. salicylic acid were absorbed by 3.36 grams polymer beads.

EXAMPLE 10

Absorptive activity of vinylpyrrolidone/acrylamide/divinylbenzene crosslinked beads based on 99 parts vinylpyrrolidone/1 part acrylamide.

In this manner, similar to Example 8, 15.1 gr. of wet beads (24% solids) prepared as in Example 6 were added to 150.0 ml. 0.992 N salicylic acid and stirred for 20 minutes. A 50 ml. aliquot was titrated with 0.1188 N NaOH 28.8 ml. of the standard base were required or 0.649 g. salicylic acid were absorbed by 3.62 grams polymer beads.

EXAMPLE 11

This experiment was conducted to demonstrate the removal of iodine from aqueous solution by the crosslinked PVP/methylenebisacrylamide beads in a packed column.

Some 175.0 g. of wet beads (prior to drying step) prepared as in Example 1 were placed in a glass column of 3 inch inside diameter and back washed with distilled water. At rest, the bead height was 11 in.

A total of 600 ml. of 0.012 N iodine-KI solution (ratio of iodine to KI by weight was 1:5) was passed through the column at a flow rate of 20 ml./minute without showing a positive test for iodine in the receiver when using a starch indicator. The lower ⅔ of the beads in the column remained unchanged in appearance and apparently were not reached by the iodine which was absorbed by the beads.

EXAMPLE 12

Beads were prepared according to Example 5 but varying the percentage of divinylbenzene (DVB) to vinyl pyrrolidone as set forth in Table 1 below.

The beads, after preparation, were washed with distilled water until free of monomer, uncrosslinked polyvinylpyrrolidone and sodium sulfate. The washed beads were then dried to constant weight at 70° C. in a vacuum oven. Portions of 100 gms. from each batch of dried beads were then completely swelled with distilled water in a beaker. The swelled beads were permitted to come to equilibrium and the excess water was poured off. The beads were then transferred to graduated cylinders and the volume occupied by the beads of each batch was measured. Table I shows the relationship of the amount of crosslinking agent (DVB) to the volume of 100 gms. of swollen beads.

TABLE 1

| Percent of DVB by weight of vinyl pyrrolidone | Batch | Volume of 100 gms. of beads, ml. |
|---|---|---|
| 0.1 [1] | A | 1,800 |
| 1.0 | B | 1,165 |
| 2.0 | C | 685 |
| 2.5 | D | 620 |
| 3.0 | E | 620 |
| 5.0 | F | 615 |

[1] Prepared as per U.S. Pat. 2,810,716 using $MgSO_4$ instead of $Na_2SO_4$.

From the above, it can be seen that at above, approximately 2.5% divinylbenzene content in the crosslinked beads, the crosslinking is sufficiently complete as to yield a stable bead whose dimensions are substantially constant independent of the amount of crosslinking agent.

EXAMPLE 13

Into individual 25 ml. burettes, onto glass, wool pledgets inserted above the stopcocks were placed 1 gm. each of dried beads from batches B and D of Example 12.

The beads were swelled by filling the burettes with distilled water. One-half hour after swelling appeared to be complete, the stopcocks on the burettes were opened and the flow rates through the beds of swelled beads were measured. Sample B completely clogged the burette and there was no throughput of water. Sample D, however, provided a flow rate of 12 ml./minute. (This was comparable to the recommended flow rates for ion exchange resins and column chromatography).

From the above, it can be seen that the beads of crosslinker content (divinylbenzene) below about 2.5% tended to deform upon swelling to such a degree that the resultant swelled beads formed a gel bed that clogged the column and prevented any throughput of liquid.

As noted above, the crosslinked porous granules or beads of a vinylpyrrolidone polymer produced in accordance with the present invention have found exceptional utility in the clarification of beverages and in other utilities wherein fast throughput is desired in absorption processes. Thus, the shape-maintaining character of the swellable bead or granule form of the crosslinked polyvinylpyrrolidone allows the same to be employed in processes wherein rapid and complete filtration (e.g. for use in packed columns where fast throughput is desired) and allows greater facility in use than was previously possible when utilizing the finely powdered material or soft-gel-forming materials of the prior art.

In addition, the novel, water-swellable, porous, granular or bead vinylpyrrolidone polymers have the ability of isolating and purifying plant enzymes. This, therefore, presents additional advantageous utility for the novel products of the present invention.

While the process and product of the present invention have been described primarily with respect to the foregoing exemplary material, it is to be understood that other variations and modifications of the described product and process which will be obvious to those skilled in the art can be made in this invention without departing from the scope or spirit thereof.

What is claimed is:

1. A process for producing a crosslinked polymer of N-vinyl pyrrolidone in a porous granular or bead form which comprises polymerizing, in an aqueous solution of an electrolyte and in the presence of a free radical polymerization initiator for N-vinyl pyrrolidone, a monomeric mixture comprising vinyl pyrrolidone and at least 2.5% by weight of said monomeric mixture of a crosslinking agent for N-vinyl pyrrolidone which contains at least two functional groups capable of taking part in the polymerization reaction to provide a crosslinked three-dimensional structure, said electrolyte solution having a concentration of the electrolyte sufficient to produce phase separation.

2. The process of claim 1 wherein said crosslinking agent is present in an amount of from 2.5 to 20% by weight based on the weight of the monomeric mixture.

3. The process of claim 2 wherein said crosslinking agent comprises N,N'-methylenebisacrylamide.

4. The process of claim 2 wherein said crosslinking agent comprises ethylene glycol dimethacrylate.

5. The process of claim 2 wherein said crosslinking agent comprises polyethylene glycol dimethacrylate.

6. The process of claim 2 wherein said crosslinking agent comprises tetraethylene glycol dimethacrylate.

7. The process of claim 2 wherein said crosslinking agent comprises divinylbenzene.

8. The process of claim 2 wherein said electrolyte comprises sodium sulfate.

9. The process of claim 2 wherein said electrolyte comprises sodium chloride.

10. The process of claim 1 wherein additional copolymerizable monomers are present in amounts up to 50% by weight, based on the monomer reactants, said copolymerizable monomers being selected from the group of acrylates and α-substituted acrylates which are capable of copolymerizing with N-vinyl pyrrolidone.

11. The process of claim 2 wherein said composition is agitated during polymerization by mechanical means.

12. The process of claim 2 wherein said aqueous electrolyte contains from about 5% to 80% by weight electrolyte based on the water.

13. The process of claim 2 wherein said aqueous electrolyte contains from about 10% to 30% by weight electrolyte based on the water.

14. The process of claim 1 wherein said crosslinking agent is present in an amount of from about 3% to about 8% by weight based on the weight of the monomeric mixture.

References Cited
UNITED STATES PATENTS

| | | | |
|---|---|---|---|
| 3,324,061 | 6/1967 | Tanquary | 260—29.2 N |
| 3,256,219 | 6/1966 | Will | 260—2.5 N |
| 3,235,490 | 2/1966 | Goren | 260—83.0 N |

MURRAY TILLMAN, Primary Examiner

M. FOELAK, Assistant Examiner

U.S. Cl. X.R.

260—29.7 H, 78.5 B, 80.3 N, 86.1 N, 88.1 PA